J. HUTH.
HOLDERS FOR SOLDERING EAVES-TROUGHS.

No. 192,435. Patented June 26, 1877.

Witnesses:
Ruth K. Abbott
Andrew Choffin

John Huth, Inventor
by Jo. Abbott, Attorney.

UNITED STATES PATENT OFFICE.

JOHN HUTH, OF SANDYVILLE, OHIO, ASSIGNOR TO HIMSELF AND JOHN VOELM, OF SAME PLACE.

IMPROVEMENT IN HOLDERS FOR SOLDERING EAVES-TROUGHS.

Specification forming part of Letters Patent No. 192,435, dated June 26, 1877; application filed April 7, 1877.

*To all whom it may concern:*

Be it known that I, JOHN HUTH, of Sandyville, in the county of Tuscarawas and State of Ohio, have invented certain new and useful Improvements in Holders for Soldering Eaves-Troughs; and that the following is a full, clear, and exact specification thereof, which will enable others skilled in the art to make and use the said invention.

My invention consists in an improved machine for holding the sections of tin forming the ordinary eaves-trough while the same are being soldered together to form the trough, by means of which I obtain a straight finished trough and greatly facilitate the operation of soldering the same.

Figure 1:
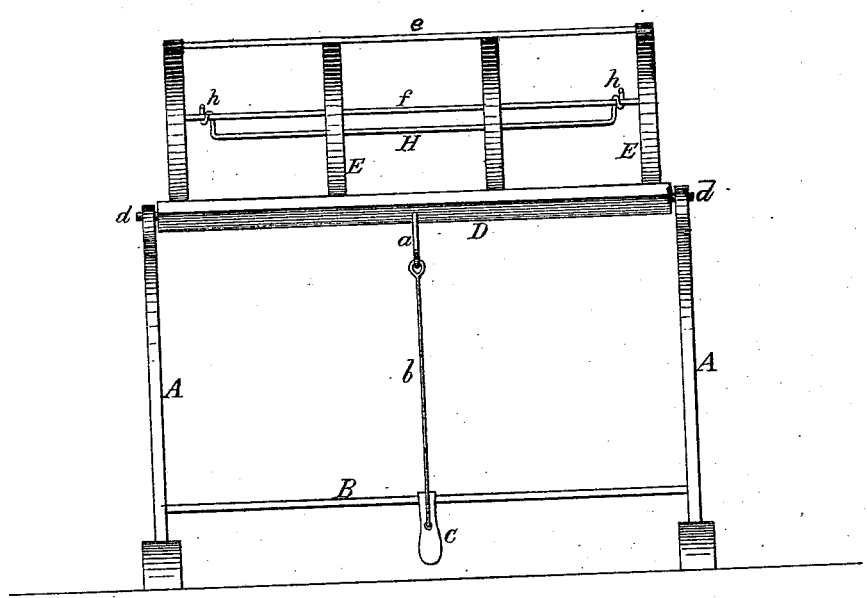
Figures 2, 3, 4:
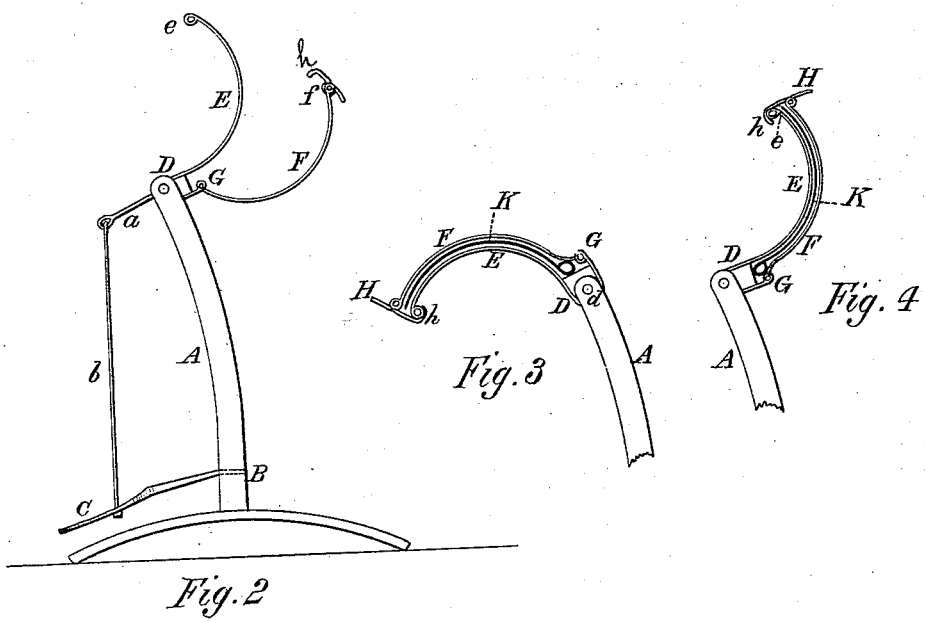

In the accompanying drawing, Figures 1 and 2 are front and end views of my improved holder, and Figs. 3 and 4 are views of the holder-head in different positions.

A B A is the main frame, which can be made of any desired length and form, and on the cross-bar B of which is pivoted the treadle C.

The cross-head D is journaled on the side pieces A A of the frame, and on it are secured the arms E E, which are curved to the form of the inner face of the trough, and are united to the rod $e$.

The clamp-arms F are curved to fit the outer face of the trough, and are pivoted at G to cross-head D, their outer ends uniting on rod $f$.

The space between the pivot G of the clamp-arms and the arms E is sufficient to admit the head-roll on the trough K, which can be placed between the arms E and F when the same are opened, as shown in Fig. 2, and can be there secured at any point along its length by bringing said arms together and uniting them by the hooks $h\ h$, or other suitable device, as shown in Figs. 3 and 4.

When the end of the partially-finished trough and a section of the same which is to be added are thus secured together between the arms E F, they will be held in line with each other, and can be soldered on the one side when in the position shown in Fig. 3, and then turned to the position shown in Fig. 4, for soldering on the other side, by stepping on the treadle C, which is connected by a cord or rod, $b$, to an arm, $a$, on the cross-head D.

What I claim as my invention is—

The within-described holder for soldering eaves-troughs, consisting of the frame A B A, with treadle C, rod $b$, arm $a$, and cross-head D, with fixed arms E, pivoted clamp-arms F, and hook $h$, the several parts being arranged and operating substantially as and for the purpose specified.

As evidence of the foregoing witness my hand this 5th day of January, A. D. 1877.

JOHN HUTH.

Witnesses:
 CHAS. H. FISHLEY,
 JOHN S. MARK.